Patent number 2,137,916
November 22, 1938

UNITED STATES PATENT OFFICE 2,137,916

MANUFACTURE OF ALGINATED WHIPPED CREAM AND PRODUCT

Alex Kleerup, Flushing, N. Y., assignor to Kelco Company, San Diego, Calif., a corporation of Delaware No Drawing. Application May 12, 1937, Serial No. 142,288

12 Claims. (Cl. 99—60)

This invention is an improvement in whipped cream pastry fillers and similar products, and consists in the process and product hereinafter described and set forth in the appended claims.

Whipped cream pastry fillers, etc., as heretofore made and stabilized for commercial use, has usually been glossy and soggy in appearance and lacks the natural fluffy light appearance, and the natural fresh flavor of whipped cream. Unless a stabilizer is used in making such commercial whipped cream products, the whipped cream will separate and the whey or watery material therein will soak into the pastry, and the paste board or paper containers thereof rendering the product very unappetizing in both appearance and taste.

I have discovered that if alginates are used in the manufacture of whipped cream pastry fillers and the like the resultant product will have the appearance of freshly whipped cream (which is dull in lustre but light and fluffy) and will maintain such appearance much longer than when gelatin or other stabilizers such as heretofore used are employed. Also the alginated whipped cream is stiffer and stronger in structure than the present commercial whipped cream and will not settle or separate in the course of handling and transportation like the present commercial whipped cream. My alginated whipped cream has a creaminess and richness that is not found in whipped cream stabilized with gelatin or other ordinary stabilizing materials, and such alginated whipped cream has a clean fresh taste which induces users to re-order more of it.

The following is one method in which alginated whipped cream product can be manufactured in accordance with my invention, but it should be understood that my invention is not restricted to the specific proportions, etc., stated.

Dissolve ten ounces of an edible alginate (preferably a sodium alginate such as disclosed in Lucas U. S. Letters Patent No. 2,097,228, dated October 26, 1937) in three and one-half quarts of warm water. While this is being dissolved, beat eighteen quarts of forty percent cream and sixteen quarts of milk in a suitable cream whipper to the maximum volume, and then fold seven pounds of sugar therein. During the whipping and folding the mixture is preferably kept cool. When the maximum whipping volume is reached, the above water alginate solution is poured into the mixture and stirred just long enough to be completely dispersed therein. The resultant alginated whipped cream may then be commercially used in various known ways, for example, in pastries, such as charlotte russes, to be shipped to hotels, restaurants and bakeries. Such alginated whipped cream can be placed in containers and sold to hotels, restaurants and bakeries for use by them wherever whipped cream is required.

The process and proportions above stated can be varied. The alginate might be added to the cream and milk during pasteurization, and then after cooling the sugar added and the mixture whipped. When this is done, the final volume obtained is not likely to be as large as that obtained in the first example given.

Further the alginate solution might be added prior to the whipping of the cream mixture; but I have found that the addition of the alginate solution after the whipping, or after partially whipping, produces a larger volume of whipped material than when the alginate is added prior to the whipping.

Again the alginate might be dissolved in a portion of the cream and milk, and then such portion added to the whipped or partly whipped product; which will produce a larger volume of material. When this is done a milk soluble alginate product such as described in Letters Patent No. 2,097,228 aforesaid should be used. In said patent a thoroughly milk soluble alginate is disclosed comprising an alginate and a salt of an acid whose calcium salt is insoluble in water, having a pH of over 7.5.

In the place of the above mentioned type of sodium alginate (which is a high pH sodium alginate product), I may also used a natural sodium alginate product; or a low viscosity sodium alginate product; such as disclosed in Patents #1,814,981, #2,036,922 and 2,036,934, and 2,097,229. Furthermore, in lieu of sodium alginates, potassium alginate and ammonium alginate or other edible water soluble alginates or alginate compounds may be used. The alginate stabilizer may be used in conjunction with other stabilizers if so desired. The proportions of ingredients, also may be varied to meet individual requirements and in accordance with the character of alginates used. If desired flavoring such as vanilla, etc., and colorings such as green, yellow, pink, etc., may also be added.

The alginates can be used to stabilize whipped cream made by the nitrous oxide gas process. In such process a metal receptacle, similar to a soda siphon bottle, is used as a container for the cream to be whipped. Such container has a valve at top and a siphon tube reaching to the bottom. A dispensing nozzle is attached to a dispensing valve at the top of the container, and when such valve is opened, the gas in the container forces the cream out of the nozzle, and the escaping cream is expanded and whipped by the gas as it escapes. The whipped cream ordinarily made by this gas method is less stable than ordinary commercial whipped cream; and one of the main objections to gas-whipped cream is the rapid and considerable lessening of the body or volume of the cream when it is allowed to stand; for as the gas escapes from the whipped cream the volume of whipped cream contracts. I have discovered that by dissolving an alginate in the cream used in making such gas-whipped cream, the resultant whipped cream is rendered much more stable and will hold its body and not lose a large percentage of volume on standing. The alginate is added to the cream before it is put into the dispensing container. It may be added when the cream is heated for pasteurization, or the alginate may be dissolved in hot milk and the hot milk solution added to the cream when it is heated during the pasteurization process.

I find it possible by employing an alginate as a stabilizer to use a twenty percent butter fat cream and get a stable whipped cream, whereas with ordinary commercial stabilizers it is necessary to use a thirty-six percent butter fat cream and even then the product obtained from the machine is very unstable.

In the claims by the word "cream" I mean to include any cream, milk or milk mixture containing sufficient butter fat to enable it to be successfully whipped.

I claim:

1. Alginated whipped cream.
2. A whipped cream mixture comprising cream and an edible alginate.
3. A whipped cream mixture including cream and a high pH edible alginate.
4. A whipped cream mixture comprising cream, an edible alginate and a sweetener.
5. A whipped cream mixture including cream, a high pH edible alginate and a sweetener.
6. Process of making alginated whipped cream consisting in mixing a soluble edible alginate with cream and whipping the mixture.
7. Process of making alginated whipped cream, consisting in whipping cream, adding a solution of an alginate, and mixing same until the alginate is completely dispersed.
8. Process of making alginated whipped cream, consisting in whipping cream, adding a solution of an edible water soluble alginate and a sweetener, and mixing until the alginate is completely dispersed.
9. Process of making alginated whipped cream; consisting in adding a soluble edible alginate to a cream during pasteurization, and whipping the mixture.
10. Process of making alginated whipped cream; consisting in adding an edible soluble alginate to cream during pasteurization, adding a sweetener to the pasteurized cream, and whipping the mixture.
11. Process of making alginated whipped cream; consisting in dissolving an alginate in cream, then adding such a solution to substantially whipped cream and thoroughly incorporating the same therewith.
12. The process of making an alginated gas-whipped cream, consisting in mixing an edible soluble alginate with the cream before it is gas-whipped.

ALEX KLEERUP.